Aug. 17, 1954 W. C. MILLER 2,686,334
FISH HOLDING CLAMP
Filed July 14, 1949
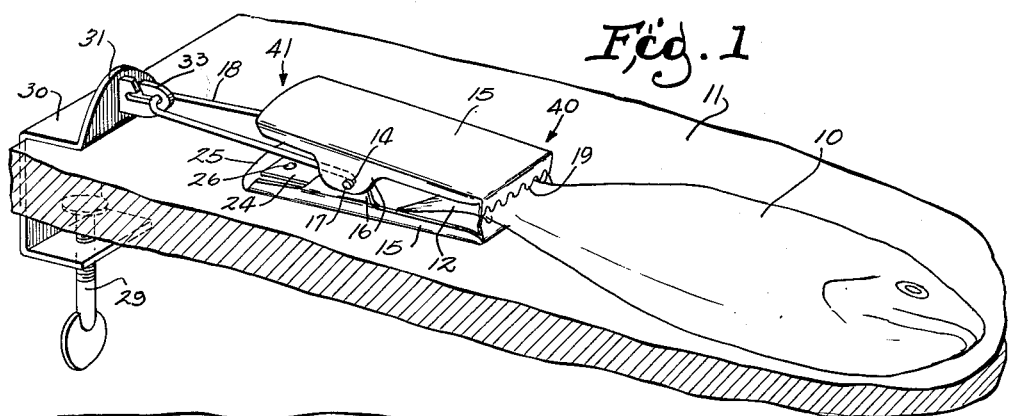
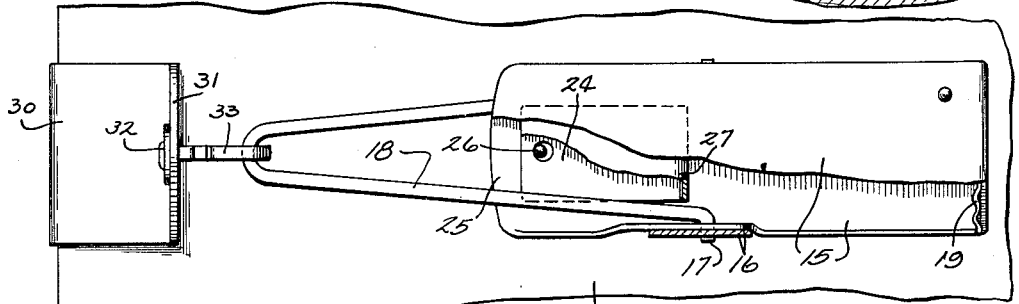
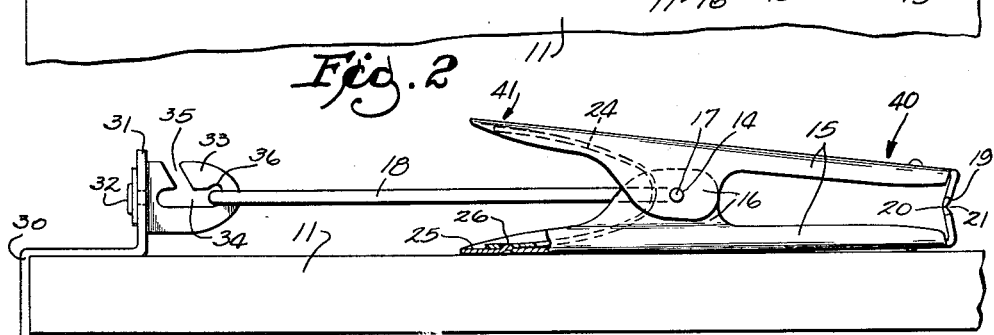
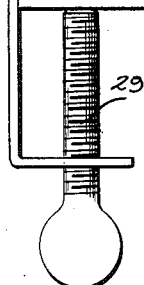
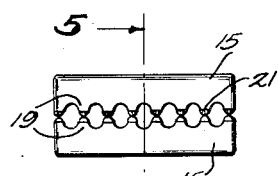
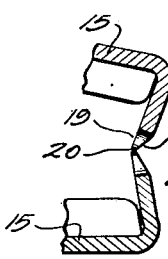
INVENTOR
WALTER C. MILLER
Wheeler, Wheeler + Wheeler
ATTORNEYS Patented Aug. 17, 1954

2,686,334

UNITED STATES PATENT OFFICE 2,686,334

FISH HOLDING CLAMP

Walter Carl Miller, West Allis, Wis.

Application July 14, 1949, Serial No. 104,778

4 Claims. (Cl. 17—8)

This invention relates to improvements in fish holding clamps.

It is the principal object of the invention to provide a clamp which will securely position a fish on a table or other supporting surface for cleaning purposes.

It is a further object of the invention to provide a clamp having self tightening fish holding jaws which will securely clamp the fish tail regardless of dislodgement forces exerted on the fish during cleaning or other related operations.

Another object of the invention is to provide, in such a clamp, for ready structural disassembly in order that the various parts may be easily cleaned. In this connection, it is an object of the invention to provide the clamp with a carrying bail having outturned ends serving as pintles upon which the clamping jaws are detachably pivoted, and which bail, clamp and its contents may be disassembled from a special anchorage coupling to permit manipulation of the fish to inverted position and for immersing it for washing purposes and the like.

Other objects will be more apparent upon an examination of the following disclosure.

In the drawings:

Fig. 1 is a perspective view showing a fish held by the clamp on a cleaning table.

Fig. 2 is a plan view on an enlarged scale of the clamp and its anchorage with portions broken away to show structural details.

Fig. 3 is a side elevational view of the subject matter of Fig. 2, partly in cross section of the clamp.

Fig. 4 is a front elevational view showing the preferred manner of aligning the meeting teeth.

Fig. 5 is an enlarged cross sectional view taken along the line 5—5 of Fig. 4.

The clamp is designed primarily to be used in the cleaning of a fish 10 which may be laid flat upon a horizontal fish cleaning board or table top 11 and engaged at its tail 12 by the clamp jaws. The clamp has a forward end 40 and a rearward end 41.

The clamp comprises complementary channel shaped jaw rockers 15, 15 which are each provided with apertured hinge tab portions 16 at either side of the rockers. The rockers are mutually pivoted through the aligned apertures 14 of said tabs upon pintles 17 which comprise the outturned ends of a carrying bail 18. An inward pressure on the diverged arms of the carrying bail 18 will disengage the respective pintles 17 from the apertures 14 of the tabs 16 whereby the clamp is readily disassembled for cleaning purposes and the like.

The fish engaging forward ends of the respective rockers 15 comprise jaws provided with inwardly and rearwardly directed teeth 19 which meet between the jaws at a rearwardly directed angle at 20. The meeting edges of the teeth are undercut as shown at 21 so as to provide blunt engageable edges which will firmly grasp and penetrate the tail of the fish but cannot cut a continuous incision because the teeth abut one another without overlap.

The slight rearward projection of the teeth from the jaw ends is for the purpose of providing the clamp with a self tightening feature whereby fish scaling and cleaning forces tending to move the fish outwardly of the jaws will succeed only in further embedding the teeth into the tail of the fish and thereby insuring the secure positioning of the fish in the clamp.

In order to hold the teeth in biting engagement with the fish tail, the handle ends of the rockers disposed rearwardly of the pintle and remote from the teeth are provided with a U shaped leaf spring 24, or the like, so biased as to urge the handle ends of the rockers apart and the jaw teeth together. The spring is free throughout its mid portion, but is positioned with respect to its ends 25 by the respective handle ends of the rockers 15 where I provide detents 26 or the like to project into perforations near the ends of the spring. The intermediate spring loop 27 of the spring 24 is disposed proximate the rocker hinge tabs 16 and between the respective spaced tabs so as to be in a relatively secure position interiorly of the clamp. It is readily understood that the outward pressure on the handle ends of the rockers remote from the clamping end is transmitted through the hinge tab fulcrum of the clamp so as to urge the teeth 19 together.

The clamp may be detachably fixed to the table top 11 by engagement of its carrying bail 18 with an anchorage preferably comprising a coupling 33 which is swiveled at 32 to upstanding ear 31 of a conventional "C" clamp 30. The "C" clamp is provided with an adjusting turn bolt 29 whereby the clamp may be readily affixed to a variety of supporting surfaces having different thicknesses. The coupling 33 is provided with an elongated slot 34 having an outwardly communicating opening 35 for the detachable reception therein of the fish clamp carrying bail 18. The slot is further provided with a pocket 36 at its end remote from the ear 31 which serves to define the operative position of the bail in the slot and impedes its accidental dislodgement from the coupling.

The carrying bail 18 may be readily disengaged from the coupling 33 through the slot opening 35; when so disengaged the fish holding clamp is useful for carrying the fish and for immersing it in a pail of water or the like for washing or other purposes.

If it is desired to invert the fish to make its underside accessible in the scaling and cleaning operation the bail may be removed from the coupling, the fish and clamp inverted and the bail replaced in the coupling slot. The same result may be accomplished by lifting the fish and clamp from support surface contact and rotating the fish and clamp 180° on the swiveled coupling to the inverted position.

From the foregoing description taken in connection with the accompanying drawings the manner of operation of the fish clamp is readily understood. For cleaning purposes the tail of the fish is clamped by the jaw teeth, and the carrying bail 18 is engaged with the coupling 33 of the "C" clamp anchorage. With the fish so positioned and held on the fish cleaning table 11 the operation of cleaning and scaling the fish may be readily performed and displacement pressures on the fish will serve only to increase the self tightening action of the jaws on the fish tail. The use of the improved clamp will enable one cleaning a fish to use both hands in the cleaning operation. Furthermore the bail may be disengaged from the coupling and the entire fish immersed in water to wash it. The clamp is easily taken apart for cleaning purposes by the simple expedient of forcing the divergent arms of the bail 18 together, whereupon the respective jaw rockers are disengaged from the pintles.

I claim:

1. In a fish holding clamp the combination with complementary channel-like rockers having corresponding clamping ends and handle ends, said rockers being mutually pivoted at a point intermediate said ends, of a plurality of inwardly and rearwardly directed teeth mounted at the corresponding clamping ends of said rockers, the said teeth projecting from said clamping ends to meet at a rearwardly directed angle therebetween, in further combination with a carrying bail having outturned ends comprising the clamp jaw pivots.

2. In a fish holding device the combination with a carrying bail having outturned ends, of a clamp comprising rocker jaws having a clamping end and a handle end remote from said clamping end, said jaws being mutually pivoted intermediate said ends on said outturned bail ends acting as pintles, said remote handle ends being urged apart by a U shaped leaf spring having ends engaged respectively with said remote handle ends and a spring loop intermediate said ends and disposed proximate to said pivot, and a plurality of teeth mounted at the clamping end of each of said jaws and projecting therefrom inwardly and rearwardly to meet at an angle.

3. The device of claim 2 wherein said teeth are aligned to meet without overlap along a line defined by the innermost projection of said teeth from said jaws and wherein said teeth are provided with undercut meeting edges.

4. The device of claim 2 in further combination with an anchorage comprising a "C" clamp having an upstanding ear and a coupling swiveled to said ear, said coupling having an elongated slot leading outwardly of said coupling for the detachable reception of said carrying bail.

References Cited in the file of this patent
UNITED STATES PATENTS

| Number | Name | Date |
|---|---|---|
| 595,221 | Viser | Dec. 7, 1897 |
| 908,256 | Harrison | Dec. 29, 1908 |
| 1,286,649 | Kayser | Dec. 3, 1918 |
| 1,358,560 | Kennison | Nov. 9, 1920 |
| 1,438,091 | Bowe | Dec. 5, 1922 |
| 1,632,194 | Possehl | June 14, 1927 |
| 2,197,206 | Curtis et al. | Apr. 16, 1940 |
| 2,220,214 | Cloutier | Nov. 5, 1940 |
| 2,224,972 | Long et al. | Dec. 17, 1940 |
| 2,312,160 | Haislip | Feb. 23, 1943 |
| 2,435,075 | Gould | Jan. 27, 1948 |
| 2,471,606 | Burns | May 31, 1949 |